United States Patent
Miyazawa

(10) Patent No.: US 7,835,084 B2
(45) Date of Patent: Nov. 16, 2010

(54) ZOOM LENS SYSTEM AND CAMERA EQUIPPED WITH THE SAME

(75) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 12/141,012

(22) Filed: Jun. 17, 2008

(65) Prior Publication Data

US 2008/0310033 A1  Dec. 18, 2008

(30) Foreign Application Priority Data

Jun. 18, 2007  (JP) ............................. 2007-159960

(51) Int. Cl.
G02B 15/14 (2006.01)
(52) U.S. Cl. ...................... 359/687; 359/683
(58) Field of Classification Search .................. 359/687
See application file for complete search history.

(56) References Cited

U.S. PATENT DOCUMENTS

| 7,177,092 | B2 * | 2/2007 | Satori et al. ............... 359/683 |
| 2003/0072086 | A1 * | 4/2003 | Uzawa et al. ............... 359/687 |
| 2008/0198476 | A1 * | 8/2008 | Kimura ....................... 359/687 |

FOREIGN PATENT DOCUMENTS

| JP | 5-060971 | 3/1993 |
| JP | 8-304700 | 11/1996 |
| JP | 11-023965 | 1/1999 |
| JP | 2000-121941 | 4/2000 |
| JP | 2003-295053 | 10/2003 |
| JP | 2005-242014 | 9/2005 |

* cited by examiner

Primary Examiner—Jordan M. Schwartz
(74) Attorney, Agent, or Firm—Canon USA Inc IP Div

(57) ABSTRACT

A zoom lens system includes a first lens unit having positive optical power, a second lens unit having negative optical power, a third lens unit having positive optical power, and a fourth lens unit having positive optical power, the lens units being arranged in that order from an object side towards an image side. The second and fourth lens units are configured to move when the zoom lens system performs zooming. In this zoom lens system, the second lens unit consists of a negative lens element, a negative lens element, a negative lens element, and a positive lens element that are arranged in that order from the object side towards the image side. The focal lengths of the third and fourth lens units are set at appropriate values so that the zoom lens system can have a high zoom ratio while exhibiting high optical performance over the entire zoom range.

11 Claims, 13 Drawing Sheets

ZOOM LENS SYSTEM AND CAMERA EQUIPPED WITH THE SAME

BACKGROUND OF THE INVENTION

1. Field of the Invention

The present invention relates to zoom lens systems. In particular, the present invention relates to a zoom lens system that is suitable as an image-forming optical system in an image pickup apparatus such as a video camera, a silver-salt photographic camera, and a digital still camera.

2. Description of the Related Art

Image pickup apparatuses such as video cameras and digital still cameras that contain solid-state image pickup elements are equipped with image-forming optical systems. As an image-forming optical system, a zoom lens system that has a high zoom ratio and can exhibit high optical performance over the entire zoom range is required.

A known example of a zoom lens system that can fulfill these requirements is a four-unit zoom lens system consisting of four lens units, which are a first lens unit having positive refractive power, a second lens unit having negative refractive power, a third lens unit having positive refractive power, and a fourth lens unit having positive refractive power that are arranged in that order from the object side towards the image side. Such a four-unit zoom lens system is known from examples of related art disclosed in Japanese Patent Laid-Open Nos. 8-304700, 2000-121941, and 2003-295053 (counterpart: U.S. Pat. No. 6,751,029). Specifically, the four-unit zoom lens system of these examples is of a so-called rear-focusing type that is configured to perform focusing by moving the second lens unit for magnification variation while compensating for an image-plane variation occurring from this magnification variation using the fourth lens unit.

Since a rear-focusing type four-unit zoom lens system performs focusing by moving relatively compact and lightweight lens units, the system is characterized in that the lens units can be driven with a small amount of force and that the focusing operation can be performed quickly.

Other examples of a rear-focusing type four-unit zoom lens system are disclosed in, for example, Japanese Patent Laid-Open Nos. 5-060971 (counterpart: U.S. Pat. No. 5,638,216) and 2005-242014 (counterpart: U.S. Pat. No. 6,972,909). The rear-focusing type four-unit zoom lens system according to these examples has a high zoom ratio and can exhibit high optical performance over the entire zoom range.

Furthermore, a compact four-unit zoom lens system is known from Japanese Patent Laid-Open No. 11-023965 (counterpart: U.S. Pat. No. 6,084,722). In this four-unit zoom lens system, the second lens unit consists of three negative lens elements and a single positive lens element.

In Japanese Patent Laid-Open No. 11-023965, the second lens unit consisting of the three negative lens elements and the single positive lens element that are arranged in that order from the object side towards the image side allows for high optical performance over the entire zoom range.

In this case, the refractive powers of the third lens unit and the fourth lens unit can be increased so that the focal length of the system at the wide-angle end can be shortened without having to excessively increase the refractive power of the second lens unit. This can allow for better compensation for the aberrations at the wide-angle end, particularly for transverse chromatic aberration.

By selecting an appropriate lens material and refractive power for each of the lens elements constituting the second lens unit, variations in the curvature of field and transverse chromatic aberration can be properly compensated for over the entire zoom range from the wide-angle end to the telephoto end.

In order to achieve compactness, high zoom ratio, and high optical performance over the entire zoom range in a zoom lens system, it is necessary to set appropriate moving conditions for the lens units for zooming, appropriate refractive powers for the lens units, and appropriate lens configurations for the lens units.

In particular, in a four-unit zoom lens system of a rear-focusing type described above, setting an appropriate lens configuration for the second lens unit used for magnification variation and appropriate refractive powers for the third and fourth lens units are significant factors for achieving a high zoom ratio and high optical performance.

If these configurations are not set properly, it becomes difficult to achieve a zoom lens system that has high optical performance over the entire zoom range from the wide-angle end to the telephoto end.

SUMMARY OF THE INVENTION

In view of these examples of related art, the present invention provides a zoom lens system having a new configuration that allows for a high zoom ratio and high optical performance over the entire zoom range.

According to an aspect of the present invention, a zoom lens system includes a first lens unit having positive refractive power (optical power=reciprocal of focal length), a second lens unit having negative refractive power, a third lens unit having positive refractive power, and a fourth lens unit having positive refractive power, which are arranged in that order from an object side towards an image side. The second and fourth lens units are configured to move when the zoom lens system performs zooming.

In this zoom lens system, the second lens unit consists of a negative lens element, a negative lens element, a negative lens element, and a positive lens element that are arranged in that order from the object side towards the image side.

Furthermore, in this zoom lens system, the following conditions are satisfied:

$$3.0 < f3/fw < 5.5, \text{ and}$$

$$3.1 < f4/fw < 4.5,$$

where f3 denotes a focal length of the third lens unit, f4 denotes a focal length of the fourth lens unit, and fw denotes a focal length of the entire system at a wide-angle end.

Further features of the present invention will become apparent from the following description of exemplary embodiments with reference to the attached drawings.

DESCRIPTION OF THE EMBODIMENTS

Figure 1:
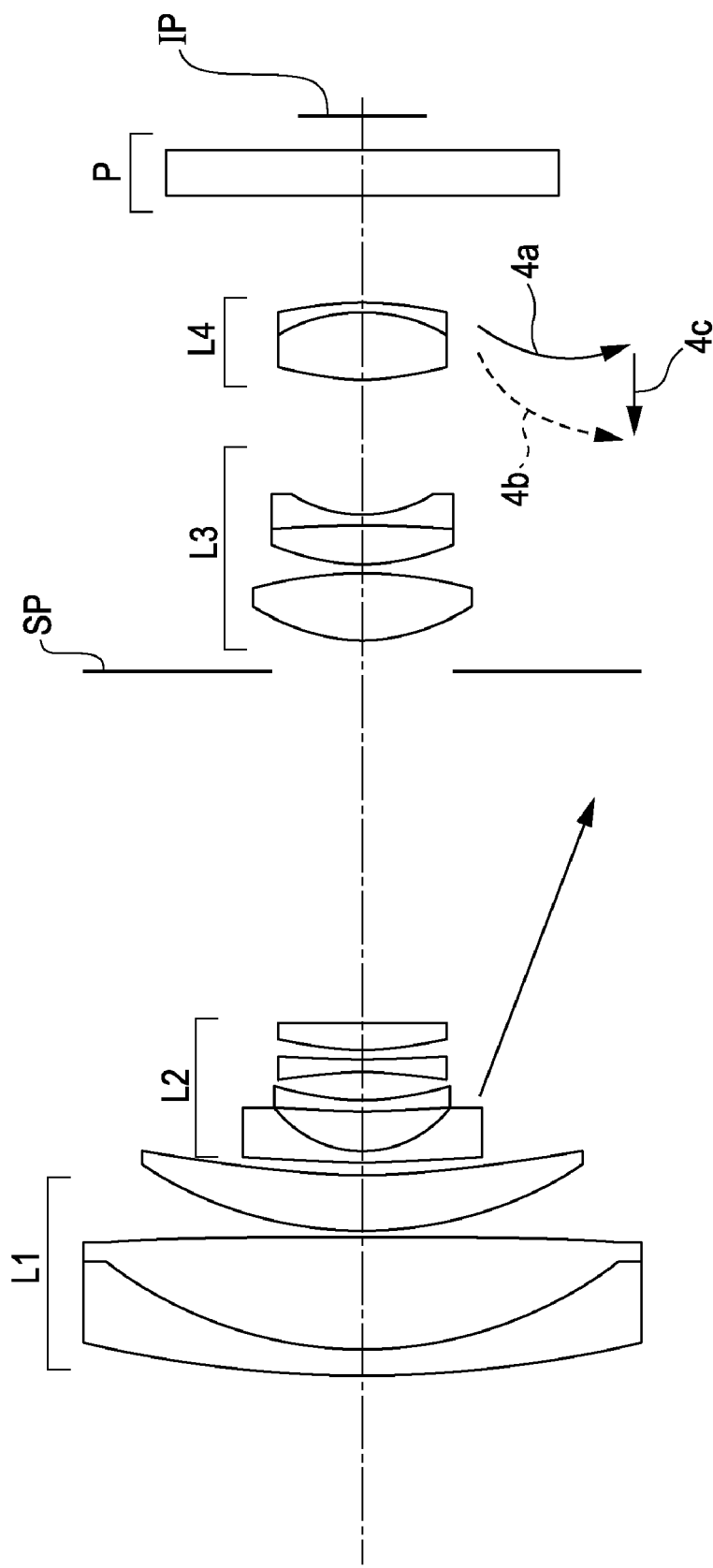
FIG. 1 is a cross-sectional view of a zoom lens system according to a first embodiment at a wide-angle end.

Exemplary embodiments of a zoom lens system and a camera equipped with the zoom lens system will now be described.

A zoom lens system according to an exemplary embodiment of the present invention includes a first lens unit having positive refractive power, a second lens unit having negative refractive power, a third lens unit having positive refractive power, and a fourth lens unit having positive refractive power, which are arranged in that order from the object side towards the image side. The zoom lens system performs zooming by moving the second and fourth lens units.

In this zoom lens system, the second lens unit consists of lens elements that are arranged in the following order from the object side towards the image side: a negative lens element, a negative lens element, a negative lens element, and a positive lens element. The second lens unit having such a configuration contributes to reduction of variation in aberrations during zooming.

The refractive powers of the third lens unit and the fourth lens unit are set to appropriate values so as to satisfy the following conditional expressions:

$$3.0 < f3/fw < 5.5 \quad (1)$$

$$3.1 < f4/fw < 4.5 \quad (2)$$

where f3 indicates the focal length of the third lens unit, f4 indicates the focal length of the fourth lens unit, and fw indicates the focal length of the entire system at a wide-angle end.

Accordingly, a zoom lens system with a high zoom ratio and reduced variation in aberrations over the entire zoom range is achieved.

The conditional expression (1) defines the ratio of the focal length of the third lens unit to the focal length of the entire system at a wide-angle end so that the aberrations at the wide-angle end can be properly compensated for in the case where the second lens unit is given the aforementioned lens configuration.

If the ratio exceeds the upper limit of the conditional expression (1), the refractive powers of the first lens unit and the second lens unit will need to be increased in order to attain a wide angle of view at the wide-angle end. This will make it difficult to compensate for the aberrations at the wide-angle end, particularly for transverse chromatic aberration.

In contrast, if the ratio falls below the lower limit, the refractive power of the third lens unit becomes too strong. This results in difficulties in compensation for spherical aberration and axial chromatic aberration at the wide-angle end.

The conditional expression (2) defines the ratio of the focal length of the fourth lens unit to the focal length of the entire system at a wide-angle end so that the fourth lens unit can be given appropriate length for back focus adjustment (i.e. a length from the last lens surface to the image plane).

If the ratio exceeds the upper limit of the conditional expression (2), the back focus becomes longer, resulting in an increased overall length of the lens system (i.e. increased length from the lens surface closest to the object side to the image plane). In addition, if an image plane variation is to be compensated for by the fourth lens unit during zooming, the ratio exceeding the upper limit will shorten the distance between the third lens unit and the fourth lens unit at the time of zooming, making it difficult to ensure a sufficient space for accommodating a lens barrel and a light-shielding member.

In contrast, if the ratio falls below the lower limit, the focal length of the fourth lens unit becomes shorter, which means that the back focus will also become shorter. This makes it difficult to ensure a sufficient space for accommodating a faceplate and an optical low-pass filter of a solid-state image pickup element. In addition, the ratio falling below the lower limit leads to an increase in the degree of aberrations occurring at the fourth lens unit.

Conditions for the zoom lens system according to the exemplary embodiment of the present invention will be described below in detail with the descriptions of the following embodiments.

Figure 2:
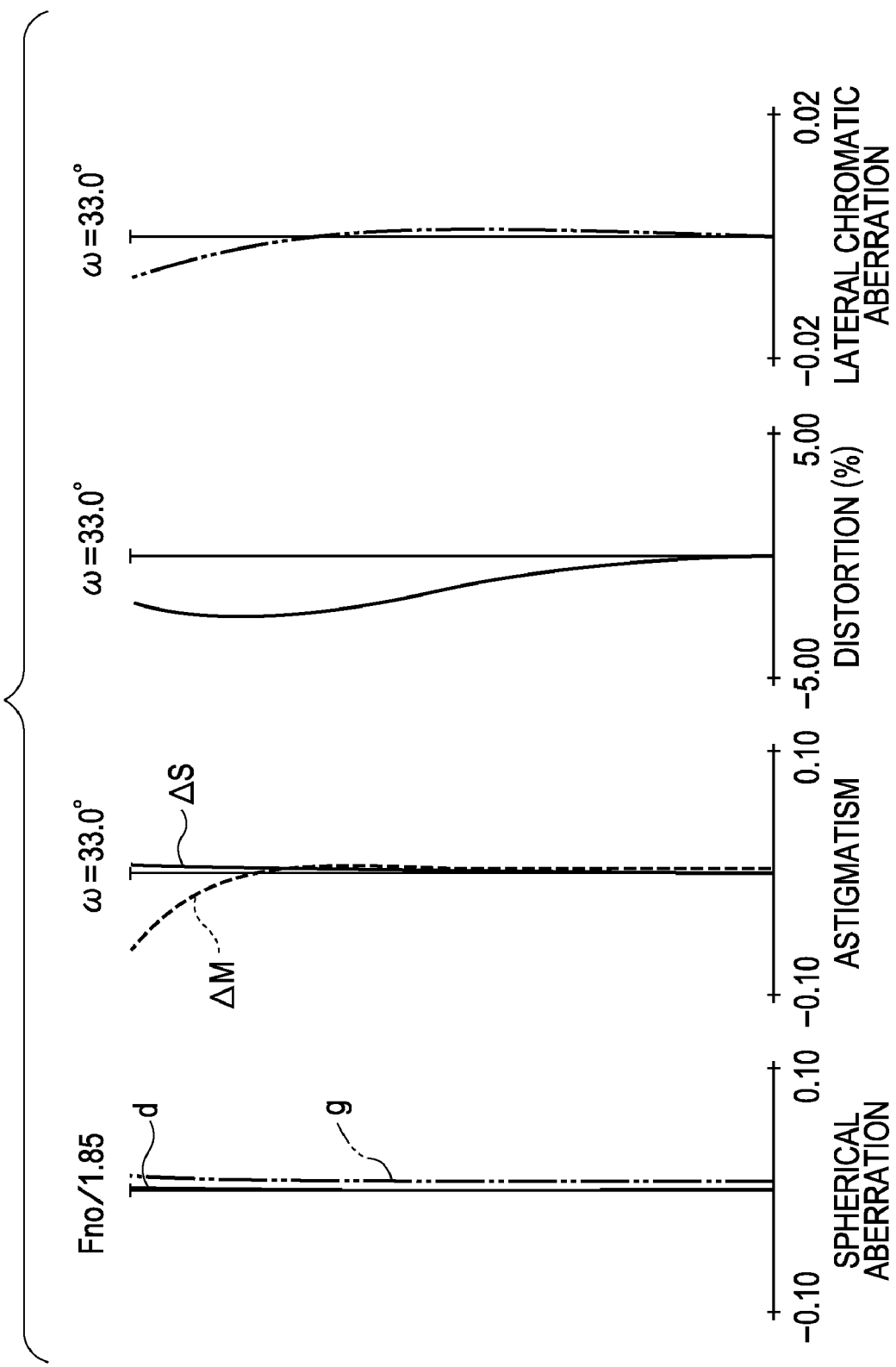
FIG. 2 illustrates aberration diagrams of the zoom lens system according to the first embodiment at a wide-angle end.
Figure 3:
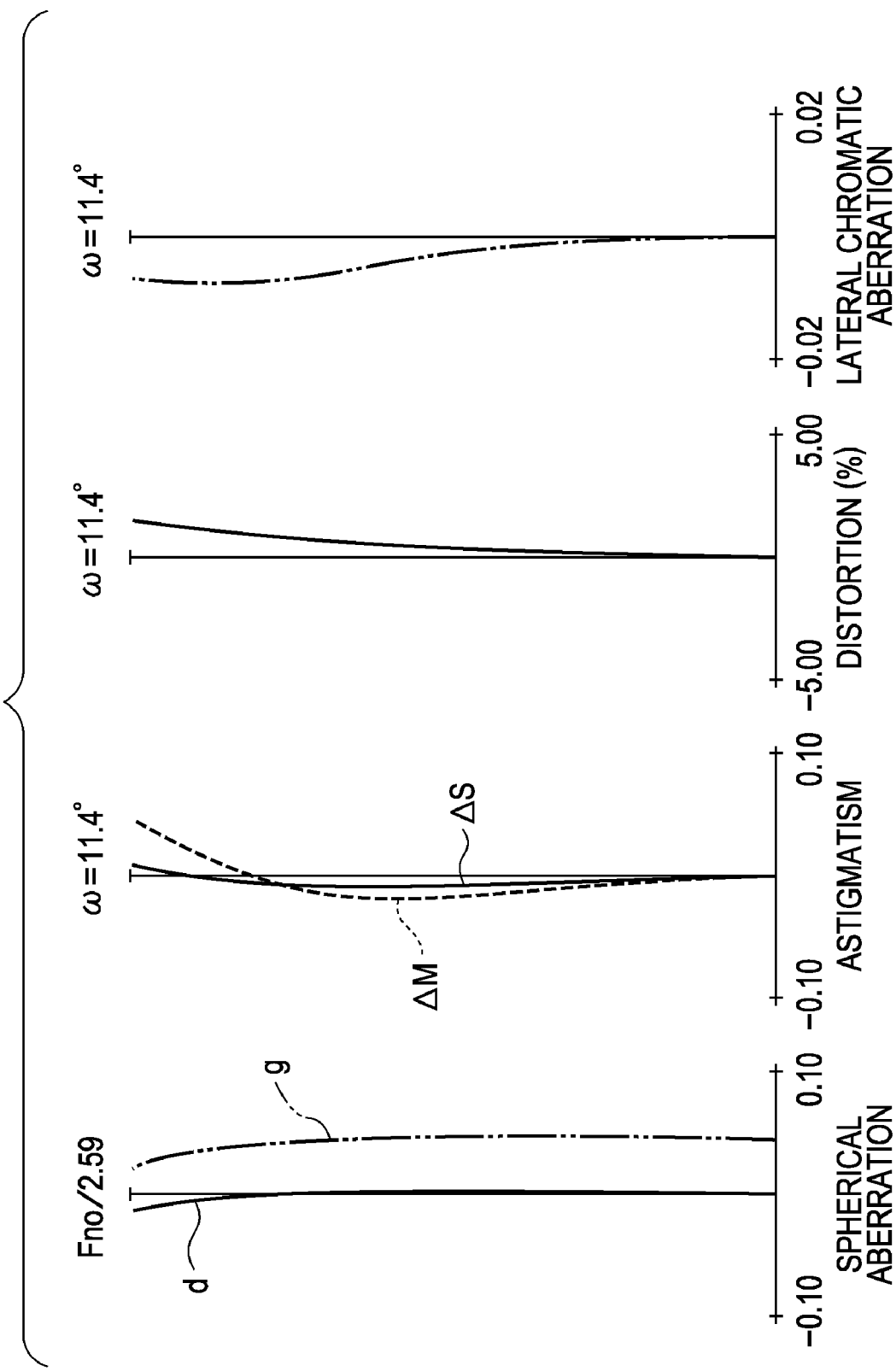
FIG. 3 illustrates aberration diagrams of the zoom lens system according to the first embodiment at an intermediate focal length.
Figure 4:
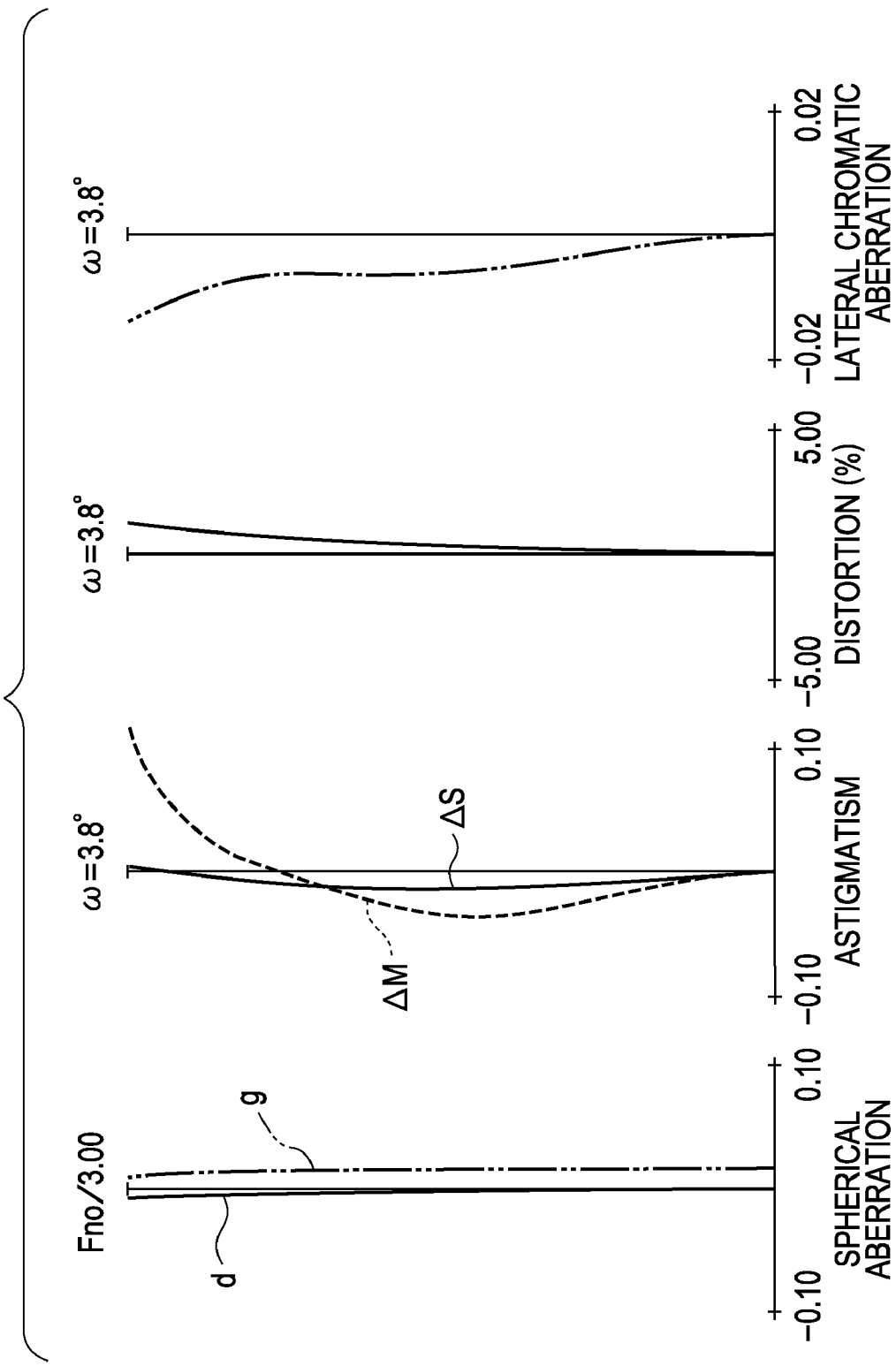
FIG. 4 illustrates aberration diagrams of the zoom lens system according to the first embodiment at a telephoto end.

FIG. 1 is a cross-sectional view of a zoom lens system according to a first exemplary embodiment at a wide-angle end (short focal-length end). FIGS. 2, 3, and 4 illustrate aberration diagrams of the zoom lens system according to the first embodiment at a wide-angle end, an intermediate zoom position, and a telephoto end (long focal-length end), respectively.

Figure 5:
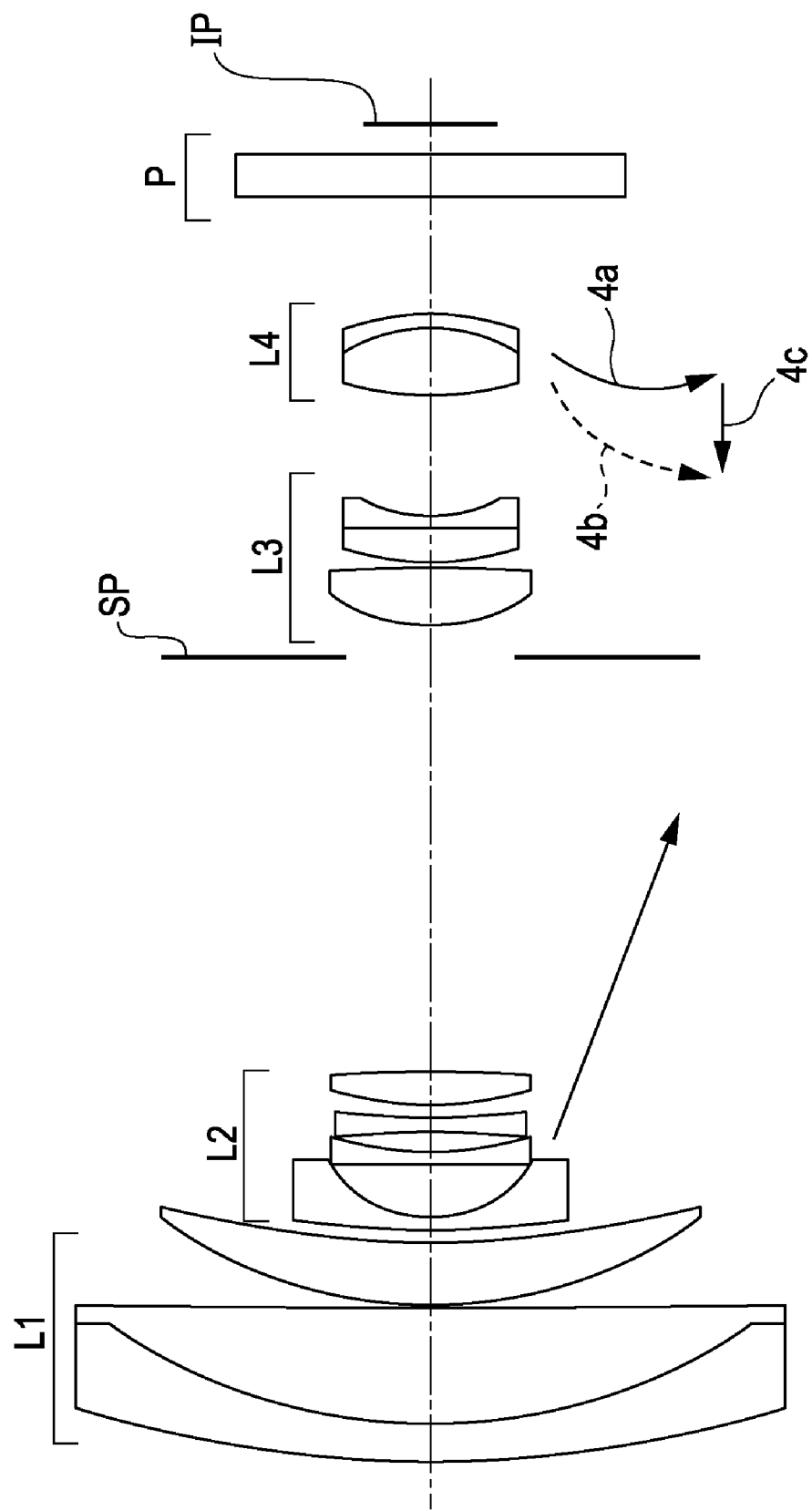
FIG. 5 is a cross-sectional view of a zoom lens system according to a second embodiment at a wide-angle end.
Figure 6:
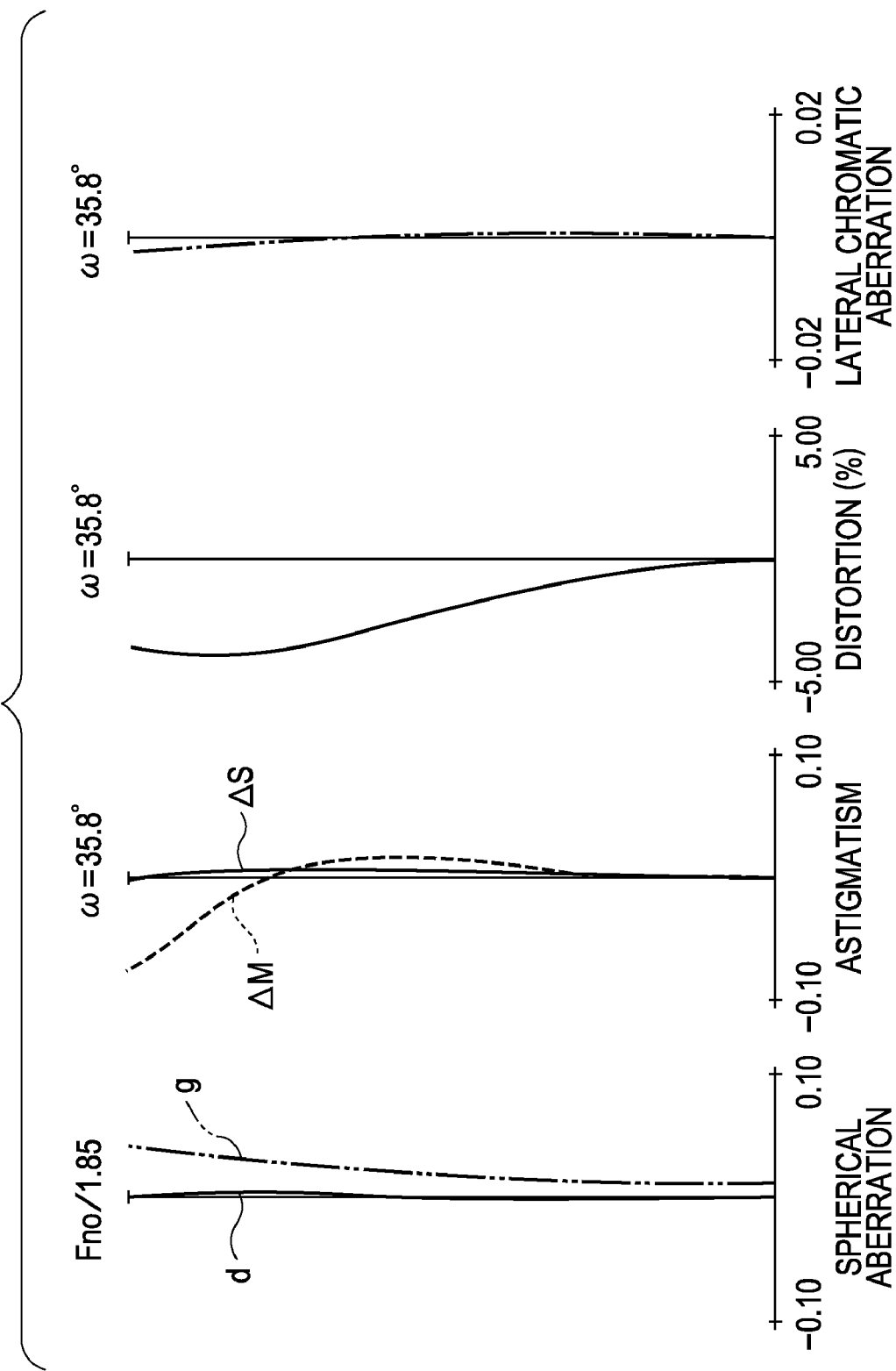
FIG. 6 illustrates aberration diagrams of the zoom lens system according to the second embodiment at a wide-angle end.
Figure 7:
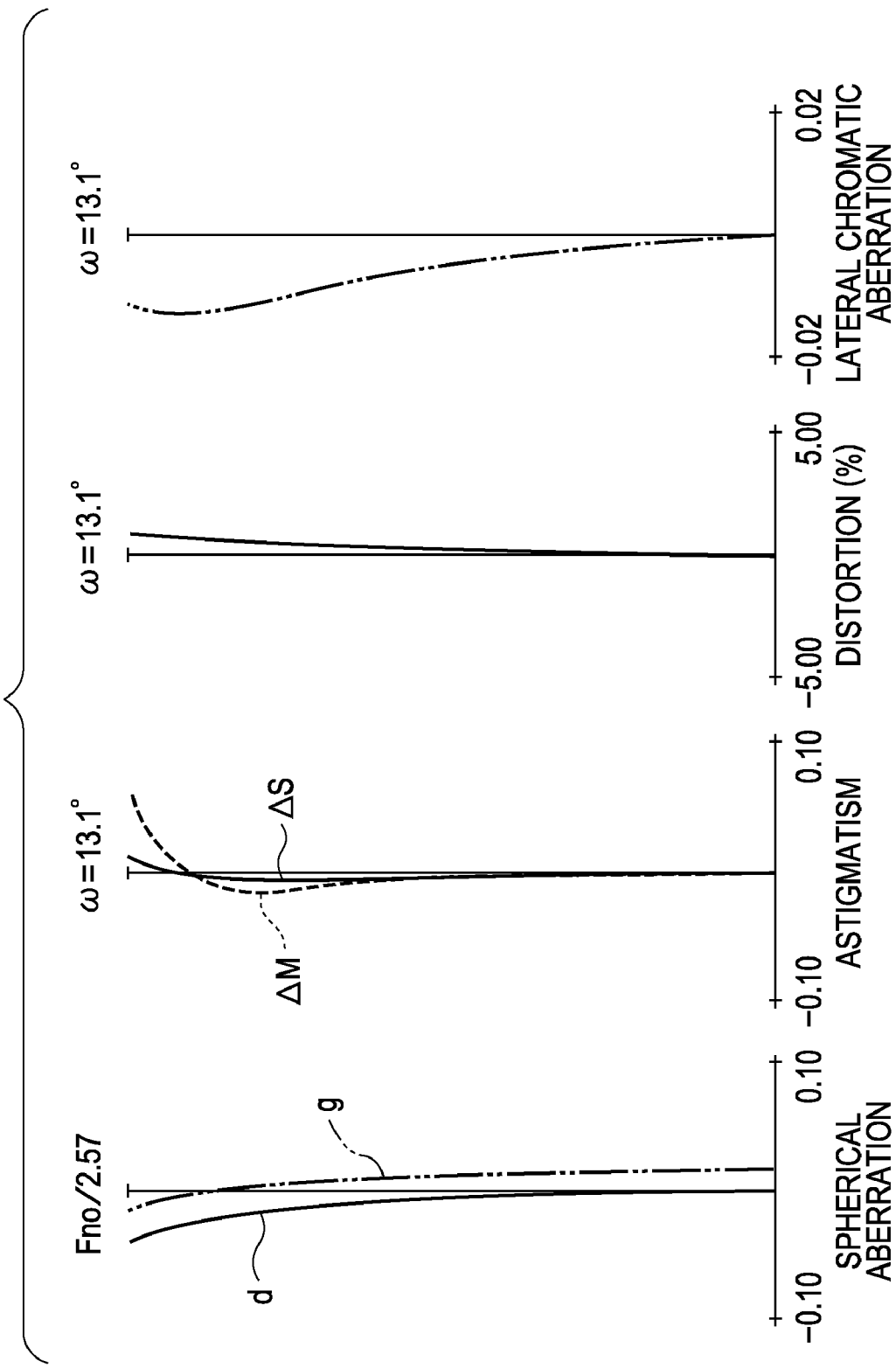
FIG. 7 illustrates aberration diagrams of the zoom lens system according to the second embodiment at an intermediate focal length.
Figure 8:
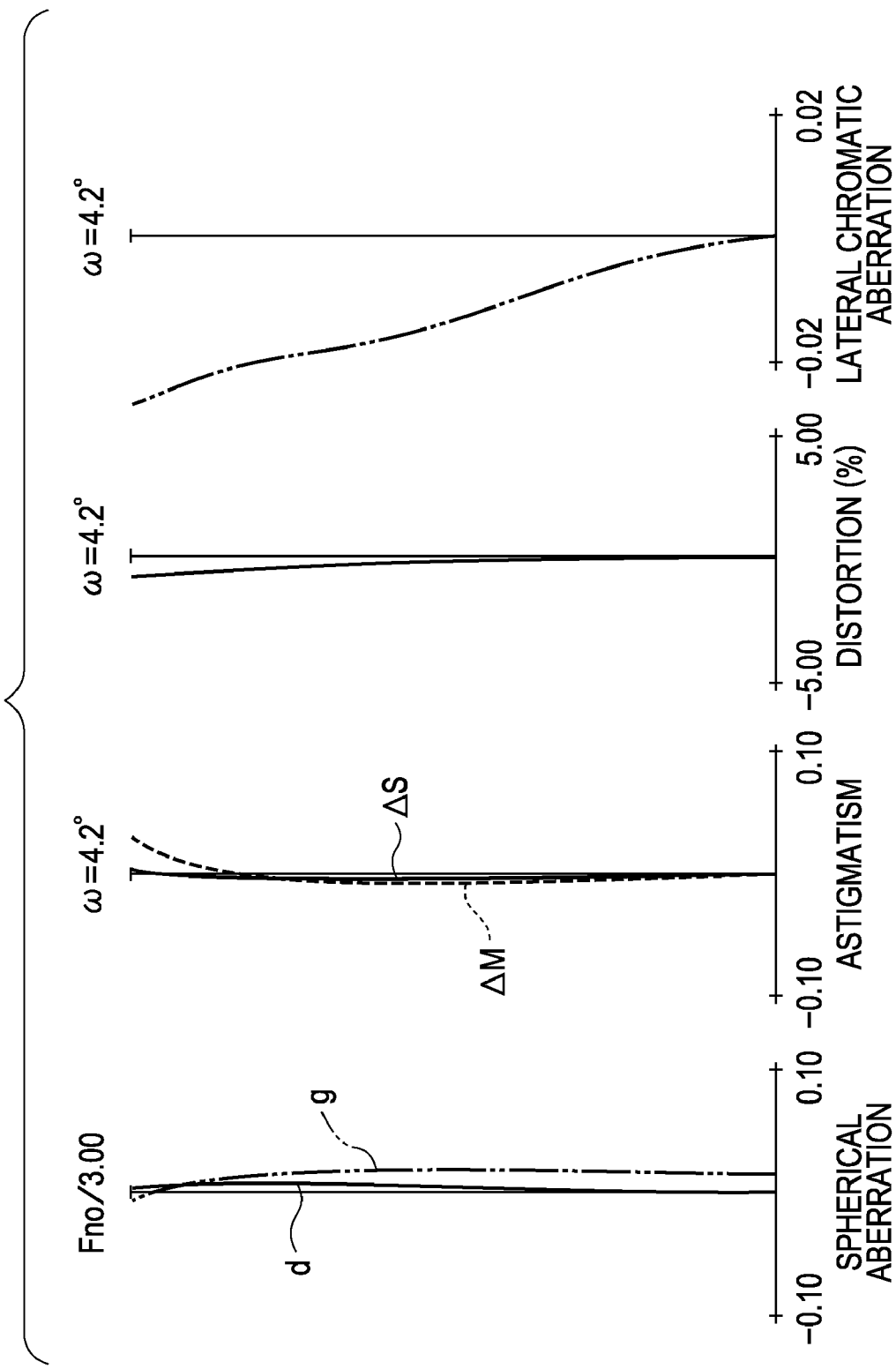
FIG. 8 illustrates aberration diagrams of the zoom lens system according to the second embodiment at a telephoto end.

FIG. 5 is a cross-sectional view of a zoom lens system according to a second exemplary embodiment at a wide-angle end. FIGS. 6, 7, and 8 illustrate aberration diagrams of the zoom lens system according to the second embodiment at a wide-angle end, an intermediate zoom position, and a telephoto end (long focal-length end), respectively.

Figure 9:
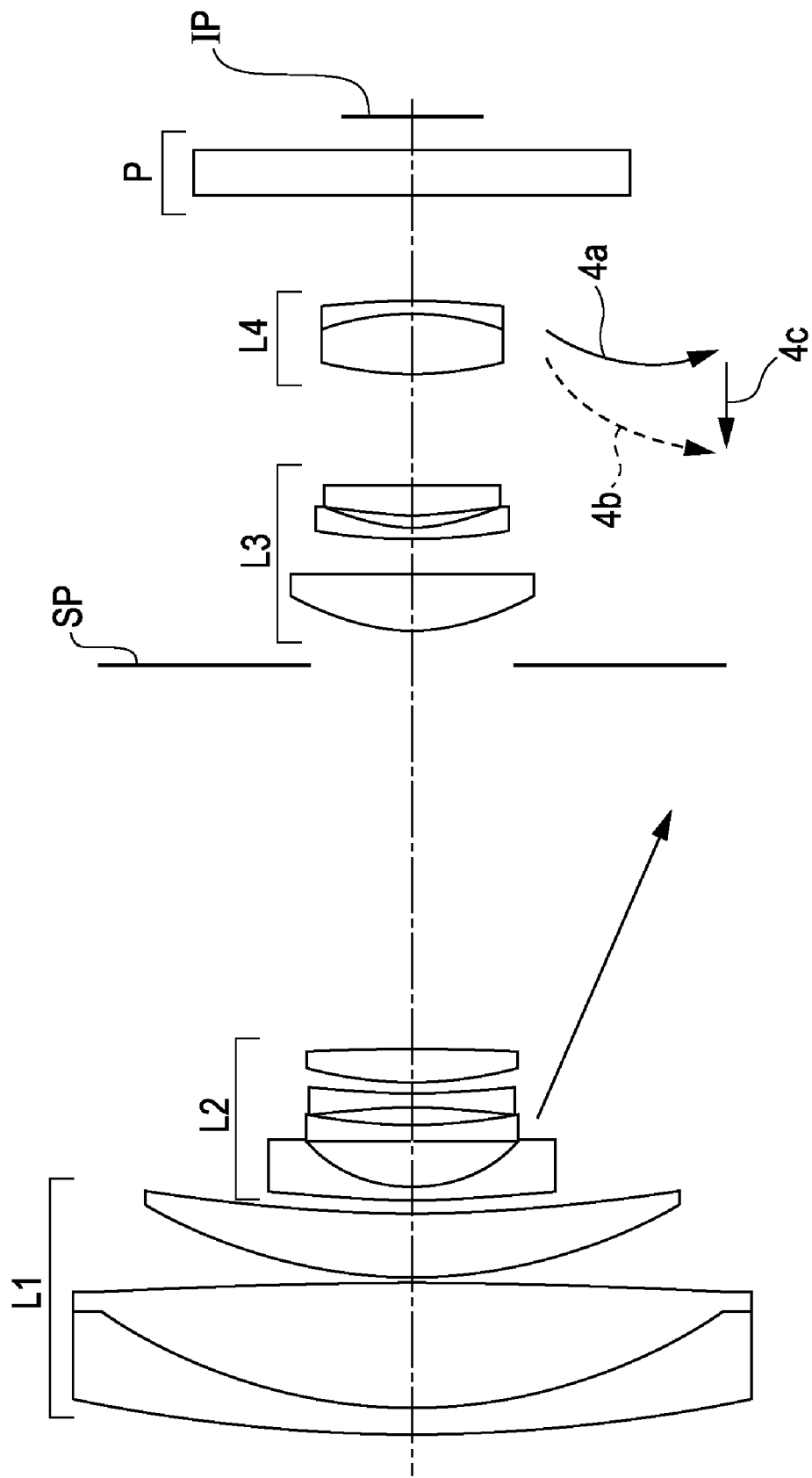
FIG. 9 is a cross-sectional view of a zoom lens system according to a third embodiment at a wide-angle end.
Figure 10:
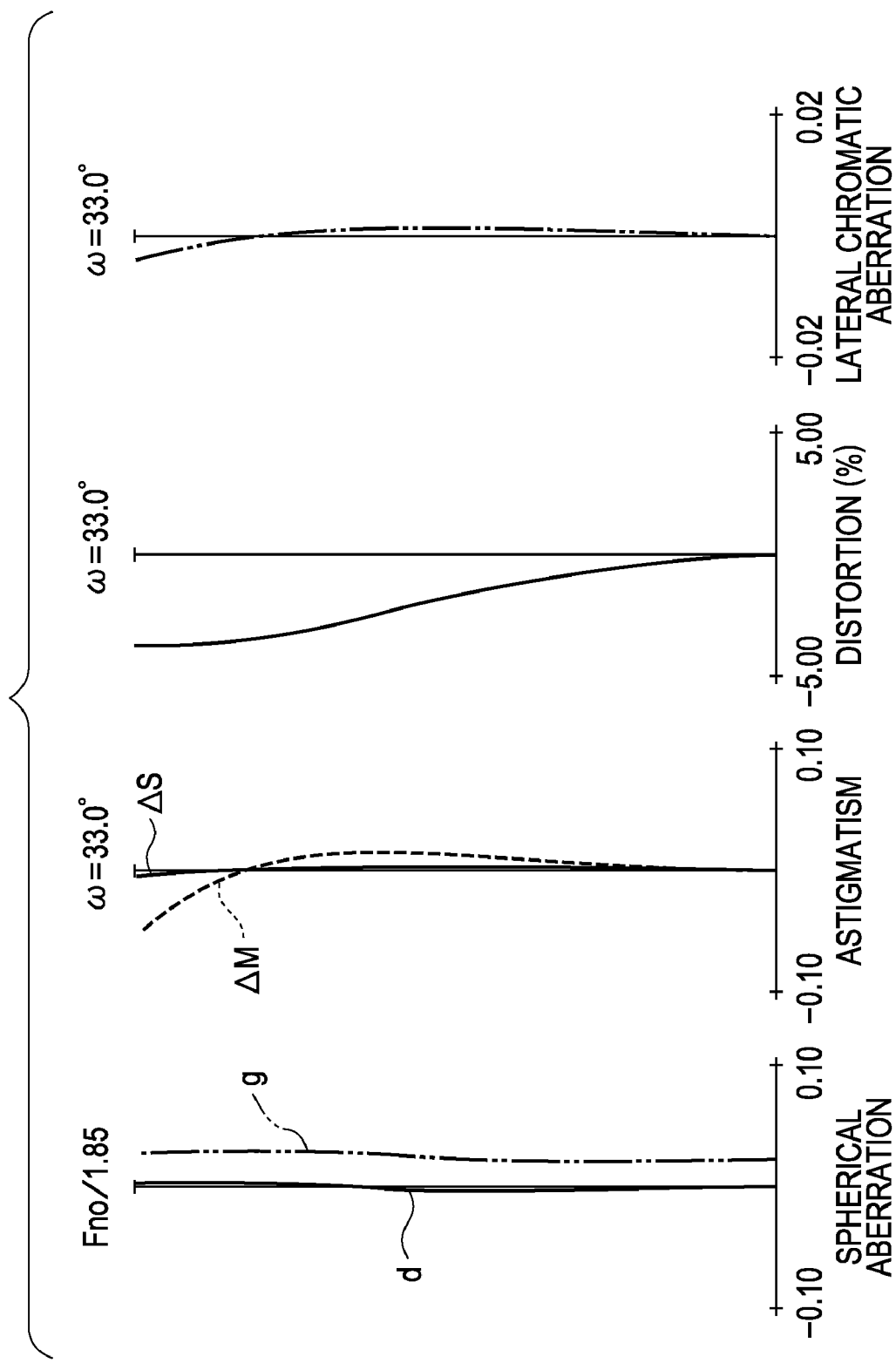
FIG. 10 illustrates aberration diagrams of the zoom lens system according to the third embodiment at a wide-angle end.
Figure 11:
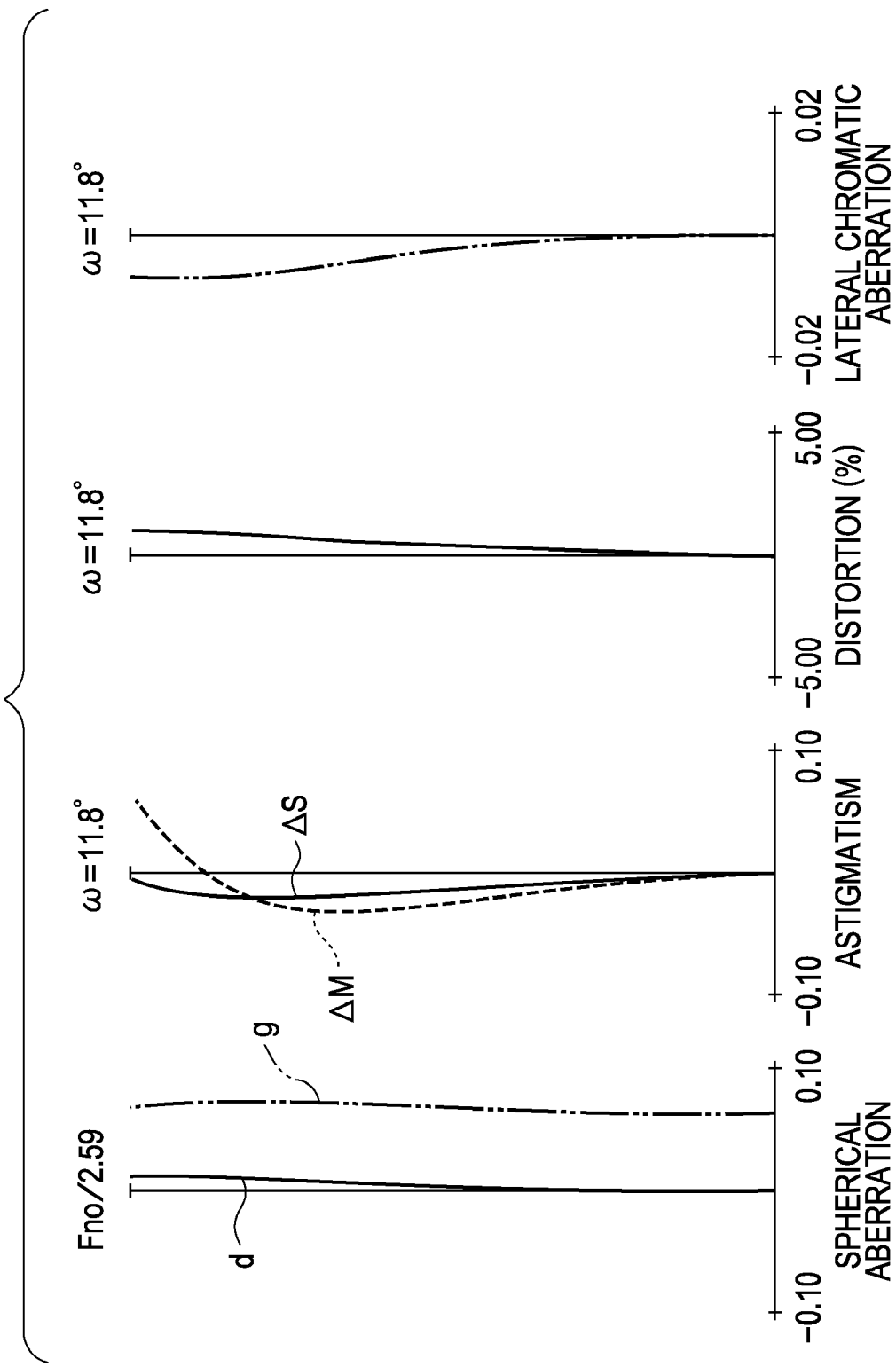
FIG. 11 illustrates aberration diagrams of the zoom lens system according to the third embodiment at an intermediate focal length.
Figure 12:
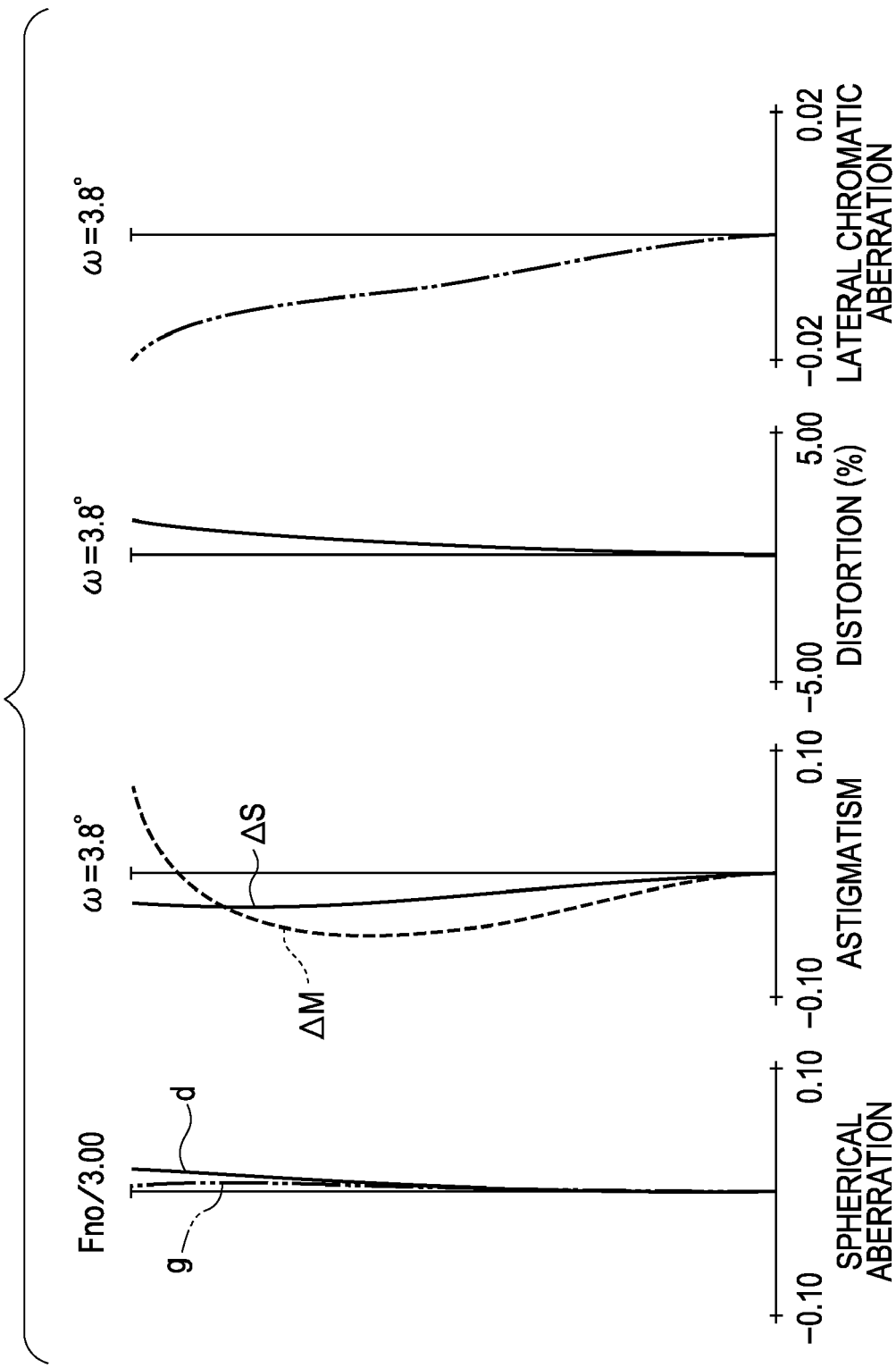
FIG. 12 illustrates aberration diagrams of the zoom lens system according to the third embodiment at a telephoto end.

FIG. 9 is a cross-sectional view of a zoom lens system according to a third exemplary embodiment. FIGS. 10, 11, and 12 illustrate aberration diagrams of the zoom lens system according to the third embodiment at a wide-angle end, an intermediate zoom position, and a telephoto end (long focal-length end), respectively.

Figure 13:
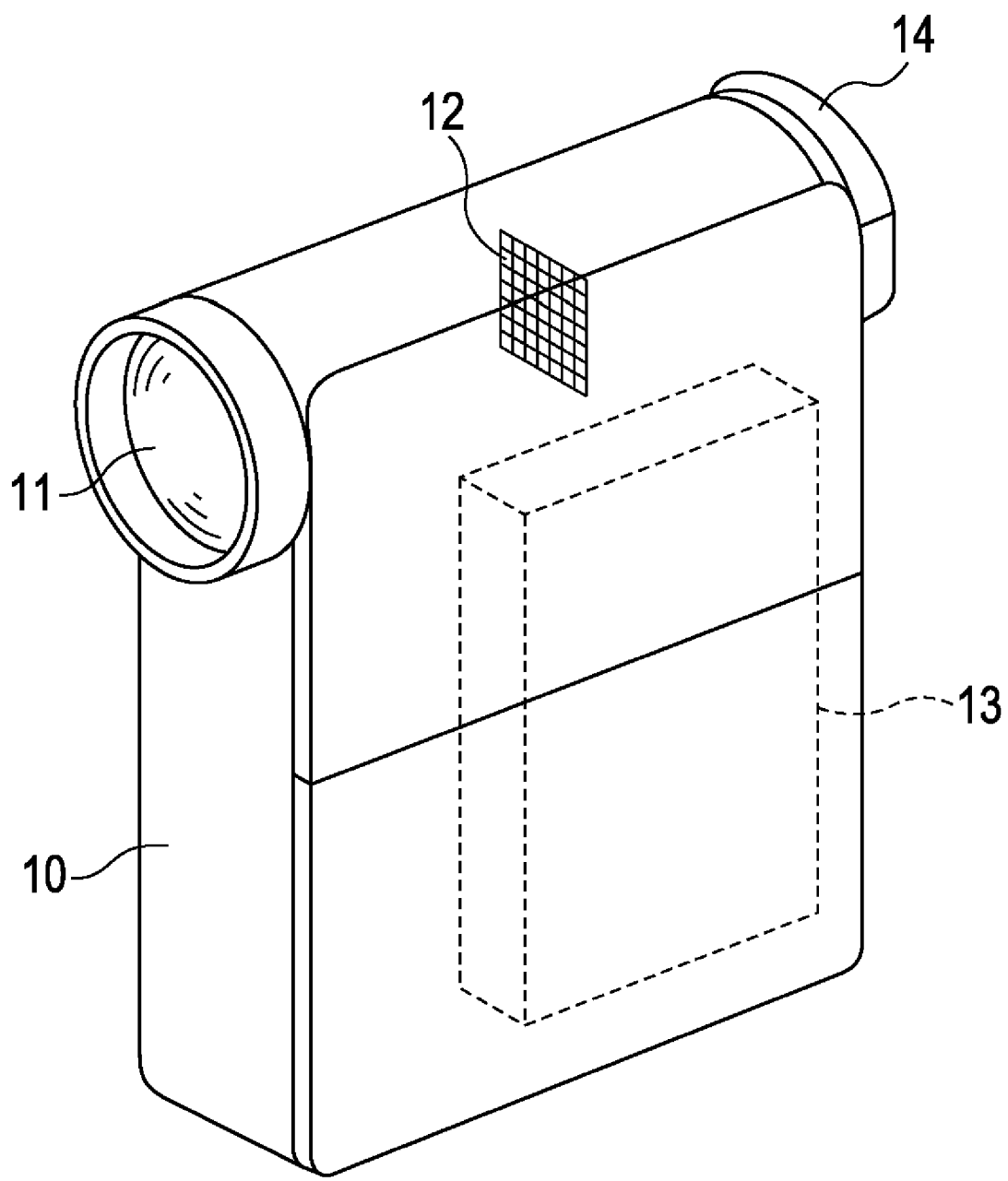
FIG. 13 is a schematic diagram of a video camera.

FIG. 13 is a schematic diagram of a video camera (image pickup apparatus) equipped with the zoom lens system according to any one of the embodiments of the present invention.

The zoom lens system according to each of the embodiments serves as an image-forming optical system used in a camera. In each of the cross-sectional views of the zoom lens system, the left side is the object side (front) and the right side is the image side (rear).

In a case where the zoom lens system according to each of the embodiments is used as a projection lens in a projector, for example, a screen is located at the left side of the zoom lens system, whereas an image to be projected is located at the right side.

Referring to each of the cross-sectional views, the zoom lens system includes a first lens unit L1 having positive refractive power, a second lens unit L2 having negative refractive power, a third lens unit L3 having positive refractive power, and a fourth lens unit L4 having positive refractive power. Reference character SP denotes an aperture stop, which is located on the object side of the third lens unit L3.

Reference character P denotes an optical block that corresponds to, for example, an optical filter, a faceplate, or the like. Reference character IP denotes an image plane. When the zoom lens system according to each of the embodiments is used as an image-forming optical system in a video camera or a digital camera, the image plane IP serves as an image pickup area of a solid-state image pickup element (photoelectric converter), such as a charge-coupled device (CCD) sensor or a complementary metal-oxide semiconductor (CMOS) sensor. If the zoom lens system is used as an image-forming optical system in a silver-salt film camera, the image plane IP serves as a film plane.

In the aberration diagrams, d and g respectively indicate the d-line and the g-line, and ΔM and ΔS respectively indicate a meridional image plane and a sagittal image plane. A transverse chromatic aberration is expressed with the g-line based on the d-line.

Fno indicates the F number, and ω indicates the half field angle.

In each of the embodiments to be described below, a wide-angle end and a telephoto end are zoom positions that correspond to opposite ends of a range within which a variable-power lens unit (second lens unit L2) is mechanically movable on an optical axis.

When performing zooming from the wide-angle end to the telephoto end in each embodiment, the magnification is varied by moving the second lens unit L2 towards the image side as shown with an arrow. At the same time, an image plane variation occurring from the magnification variation is compensated for by moving the fourth lens unit L4 along a locus convex towards the object side.

The zoom lens system is of a rear-focusing type in which focusing is performed by moving the fourth lens unit L4 on the optical axis.

When performing focusing from an object at infinity to a near object at the telephoto end, the fourth lens unit L4 is moved forward as shown with an arrow 4c in the cross-sectional views. A solid curve 4a represents a locus of the fourth lens unit L4 for compensating for an image-plane variation occurring from a magnification variation when an object at infinity is in focus. A dashed curve 4b represents a locus of the fourth lens unit L4 for compensating for an image-plane variation occurring from a magnification variation when a near object is in focus.

Allowing the fourth lens unit L4 to be movable along loci that are convex towards the object side in this manner contributes to an efficient use of the space between the third lens unit L3 and the fourth lens unit L4, whereby the lens system can be effectively reduced in its overall length.

Basically, none of the first lens unit L1, the third lens unit L3, and the aperture stop SP are moved in the optical-axis direction for zooming or focusing. However, they may be configured to be movable if necessary, such as for compensating for aberrations.

The zoom lens system according to each embodiment has the following lens configuration. Specifically, in the following order from the object side towards the image side, the first lens unit L1 includes a cemented lens consisting of a negative meniscus lens element having a convex surface on its object side and a positive lens element, and a positive meniscus lens element having a convex surface on its object side.

The second lens unit L2 includes a negative meniscus lens element having a concave surface on its image side, a negative lens element having a concave surface on its image side, a negative biconcave lens element, and a positive lens element having a convex surface on its object side, which are arranged in that order from the object side towards the image side.

Accordingly, over the entire zoom range from the wide-angle end to the telephoto end, the curvature of field and spherical aberration at the telephoto end can be properly compensated for. In particular, the above configuration allows for proper compensation for astigmatism and distortion at the wide-angle end.

The third lens unit L3 includes a positive biconvex lens element, a positive lens element having a convex surface on its object side, and a negative lens element having a concave surface on its image side, which are arranged in that order from the object side towards the image side.

Accordingly, the spherical aberration and axial chromatic aberration at the wide-angle end are compensated for, and moreover, the curvature of field is compensated for over the entire zoom range from the wide-angle end to the telephoto end.

The fourth lens unit L4 includes a cemented lens consisting of a positive biconvex lens element and a negative meniscus lens element having a convex surface on its image side.

Accordingly, the curvature of field is compensated for over the entire zoom range, and moreover, variations in the axial chromatic aberration and transverse chromatic aberration are minimized.

In addition, the above configuration allows for reduced variations in aberrations when performing focusing with the fourth lens unit L4.

Accordingly, the aforementioned conditional expressions (1) and (2) are satisfied. Further, conditions required in the zoom lens system for solving various technical issues will be described below.

Firstly, when the focal length of the entire system at the telephoto end is indicated by ft, it is preferable that the following conditional expressions be satisfied:

$$1.00 < f3/\sqrt{fw \times ft} < 1.65 \qquad (3)$$

$$0.90 < f4/\sqrt{fw \times ft} < 1.30 \qquad (4)$$

The conditional expression (3) defines the focal length of the third lens unit L3.

If the focal length of the third lens unit L3 exceeds the upper limit of the conditional expression (3) such that the focal length of the third lens unit L3 becomes greater relative to the zoom ratio, the aberration compensation may become easier but the overall length of the lens system is undesirably increased.

In contrast, if the focal length of the third lens unit L3 falls below the lower limit such that the focal length of the third lens unit L3 becomes shorter, the compensation for spherical aberration and axial chromatic aberration becomes difficult mainly at the wide-angle end.

The conditional expression (4) defines the focal length of the fourth lens unit L4.

If a desired field angle and high zoom ratio are to be attained in a state where the focal length of the fourth lens unit L4 is above the upper limit of the conditional expression (4), the lens system will be increased in its overall length. In contrast, if the focal length of the fourth lens unit L4 falls below the lower limit such that the focal length of the fourth lens unit L4 becomes shorter relative to the zoom ratio, variations in the curvature of field and transverse chromatic aberration will increase over the entire zoom range from the wide-angle end to the telephoto end, thus making it difficult to compensate for the curvature of field and transverse chromatic aberration.

Secondly, it is preferable that the following conditional expression (5) be satisfied:

$$1.83 < N13 \quad (5)$$

where N13 indicates the refractive index of the material constituting the positive lens element disposed closest to the image side in the first lens unit L1. In this case, the refractive index is based on the d-line.

The conditional expression (5) defines the refractive index of the material constituting the positive lens element disposed closest to the image side in the first lens unit L1. If the refractive index falls below the lower limit of the conditional expression (5), the effective front lens diameter is increased, thus making it difficult to compensate for the spherical aberration and the curvature of field at the telephoto end.

Thirdly, it is preferable that the following condition be satisfied:

$$v24 < 20 \quad (6)$$

where v24 indicates the Abbe number of the material constituting the positive lens element in the second lens unit L2. An Abbe number v is expressed as follows:

$$v = (Nd-1)/(NF-NC)$$

Nd: refractive index with respect to d-line (587.6-nm wavelength)

NF: refractive index with respect to F-line (486.1-nm wavelength)

NC: refractive index with respect to C-line (656.3-nm wavelength)

The conditional expression (6) defines the Abbe number of the material constituting the positive lens element included in the second lens unit L2. If the Abbe number exceeds the upper limit of the conditional expression (6), it becomes difficult to compensate for variations in the curvature of field and transverse chromatic aberration over the entire zoom range from the wide-angle end to the telephoto end.

Fourthly, it is preferable that the following condition be satisfied:

$$2.02 < |f24/f2| < 2.90 \quad (7)$$

where f24 indicates the focal length of the positive lens element in the second lens unit L2, and f2 indicates the focal length of the second lens unit L2.

The conditional expression (7) defines the focal length of the positive lens element in the second lens unit L2. If the focal length exceeds the upper limit of the conditional expression (7), the principal point of the second lens unit L2 undesirably shifts towards the image side, resulting in an increased effective front lens diameter.

In contrast, if the focal length falls below the lower limit of the conditional expression (7), it becomes difficult to compensate for the curvature of field at a focal length corresponding to an intermediate zoom position and for the spherical aberration at the telephoto end.

Fifthly, it is preferable that the following condition be satisfied:

$$1.10 < f21/f2 < 1.36 \quad (8)$$

where f21 indicates the focal length of the negative lens element positioned closest to the object side in the second lens unit L2.

The conditional expression (8) defines the focal length of the negative lens element positioned closest to the object side in the second lens unit L2.

Like the conditional expression (7), the conditional expression (8) is for implementing proper compensation of the aberrations while minimizing the increase in the effective front lens diameter.

If the focal length exceeds the upper limit of the conditional expression (8), the effective front lens diameter will increase. In contrast, if the focal length falls below the lower limit, the compensation for astigmatism and distortion at the wide-angle end becomes difficult.

The zoom lens system according to each of the first to third embodiments satisfies all of the aforementioned conditional expressions (3) to (8). However, this does not necessarily mean that the zoom lens system must satisfy all of the conditional expressions at the same time. The zoom lens system can achieve the advantage corresponding to each of the conditional expressions by satisfying that specific conditional expression.

It is more preferable that the numerical ranges of the conditional expressions (1) to (8) be set as follows:

$$3.2 < f3/fw < 5.0 \quad (1a)$$

$$3.1 < f4/fw < 4.1 \quad (2a)$$

$$1.05 < f3/\sqrt{fw \times ft} < 1.62 \quad (3a)$$

$$0.93 < f4/\sqrt{fw \times ft} < 1.26 \quad (4a)$$

$$1.833 < N13 \quad (5a)$$

$$v24 < 19.5 \quad (6a)$$

$$2.04 < |f24/f2| < 2.80 \quad (7a)$$

$$1.10 < f21/f2 < 1.30 \quad (8a)$$

As mentioned above, the zoom lens system according to each of the embodiments has high optical performance over entire zoom range and a high zoom ratio of about 10×.

As an alternative configuration, in each of the embodiments, a lens unit including, for example, a converter lens or a close-up lens may be disposed adjacent to one of or each of the object side of the first lens unit L1 and the image side of the fourth lens unit L4.

Next, first to third numerical examples respectively corresponding to the first to third embodiments will be described below.

In each numerical example, i indicates the surface number counted from the object side, Ri indicates the radius of curvature of an $i^{th}$ lens surface ($i^{th}$ surface), Di indicates the distance between $i^{th}$ and $(i+1)^{th}$ lens surfaces, Ni indicates the refractive index of an $i^{th}$ optical member based on the d-line, and vi indicates the Abbe number of an $i^{th}$ optical member based on the d-line.

In the first to third numerical examples, the two surfaces closest to the image side are surfaces corresponding to the optical block P.

When X is the displacement from the vertex of an aspheric surface in the optical-axis direction at a height of h from the optical axis, the shape of the aspheric surface is expressed as follows:

$$X = \frac{(1/R)h^2}{1+\sqrt{1-(1+k)(h/R)^2}} + Bh^4 + Ch^6 +$$
$$Dh^8 + Eh^{10} + A'h^3 + B'h^5 + C'h^7 + D'h^9 + E'h^{11}$$

where k indicates a conic constant, B, C, D, E, A', B', C', D', and E' indicate aspherical coefficients for the corresponding orders, and R indicates a paraxial radius of curvature.

In addition, "e-Z", for example, indicates "$10^{-z}$". The relationship between the aforementioned conditional expressions and the numerical values in the numerical examples are shown in Table 1 provided below.

FIRST NUMERICAL EXAMPLE

| f = 5.17 to 50.38 Fno = 1.85 to 3.00 2ω = 65.9° to 7.6° | | | |
|---|---|---|---|
| R1 = 66.137 | D1 = 1.40 | N1 = 1.846660 | ν1 = 23.9 |
| R2 = 22.494 | D2 = 5.98 | N2 = 1.696797 | ν2 = 55.5 |
| R3 = −250.501 | D3 = 0.20 | | |
| R4 = 20.181 | D4 = 3.06 | N3 = 1.834807 | ν3 = 42.7 |
| R5 = 48.869 | D5 = Variable | | |
| R6 = 49.152 | D6 = 0.70 | N4 = 1.882997 | ν4 = 40.8 |
| R7 = 5.880 | D7 = 2.07 | | |
| R8 = 33.517 | D8 = 0.65 | N5 = 1.834807 | ν5 = 42.7 |
| R9 = 12.834 | D9 = 1.55 | | |
| R10 = −19.181 | D10 = 0.65 | N6 = 1.772499 | ν6 = 49.6 |
| R11 = 50.904 | D11 = 0.43 | | |
| R12 = 16.514 | D12 = 1.48 | N7 = 1.922860 | ν7 = 18.9 |
| R13 = −166.079 | D13 = Variable | | |
| R14 = Stop | D14 = 1.65 | | |
| R15 = 9.320 | D15 = 3.50 | N8 = 1.583126 | ν8 = 59.4 |
| R16 = −19.925 | D16 = 0.49 | | |
| R17 = 12.385 | D17 = 2.05 | N9 = 1.487490 | ν9 = 70.2 |
| R18 = −71.591 | D18 = 0.60 | N10 = 1.806100 | ν10 = 33.3 |
| R19 = 8.037 | D19 = Variable | | |
| R20 = 14.441 | D20 = 3.61 | N11 = 1.583126 | ν11 = 59.4 |
| R21 = −7.754 | D21 = 0.60 | N12 = 1.846660 | ν12 = 23.9 |
| R22 = −14.536 | D22 = Variable | | |
| R23 = ∞ | D23 = 2.40 | N13 = 1.516330 | ν13 = 64.1 |
| R24 = ∞ | | | |

| | Focal Length | | |
|---|---|---|---|
| Variable Distance | 5.17 | 16.58 | 50.38 |
| D5 | 0.60 | 11.51 | 17.64 |
| D13 | 18.59 | 7.68 | 1.55 |
| D19 | 7.15 | 3.79 | 7.46 |
| D22 | 5.69 | 9.06 | 5.39 |

| | Aspherical Coefficients | | |
|---|---|---|---|
| R15 | k = −9.27550e−01 | B = 0.00000e+00 | C = 0.00000e+00 |
| | D = 0.00000e+00 | E = 0.00000e+00 | A' = 0.00000e+00 |
| | B' = 1.26914e−06 | C' = 3.58639e−08 | D' = 0.00000e+00 |
| | E' = 0.00000e+00 | | |
| R16 | k = −8.77184e+00 | B = 0.00000e+00 | C = 0.00000e+00 |
| | D = 0.00000e+00 | E = 0.00000e+00 | A' = 0.00000e+00 |
| | B' = 3.49226e−06 | C' = 0.00000e+00 | D' = 0.00000e+00 |
| | E' = 0.00000e+00 | | |
| R20 | k = −1.37330e+00 | B = 9.26962e−06 | C = 1.65369e−07 |
| | D = 0.00000e+00 | E = 0.00000e+00 | A' = 0.00000e+00 |
| | B' = 0.00000e+00 | C' = 0.00000e+00 | D' = 0.00000e+00 |
| | E' = 0.00000e+00 | | |

SECOND NUMERICAL EXAMPLE

| f = 4.65 to 45.34 Fno = 1.85 to 3.00 2ω = 71.5° to 8.4° | | | |
|---|---|---|---|
| R1 = 62.567 | D1 = 2.00 | N1 = 1.922860 | ν1 = 18.9 |
| R2 = 30.279 | D2 = 6.36 | N2 = 1.772499 | ν2 = 49.6 |
| R3 = 892.141 | D3 = 0.20 | | |
| R4 = 25.134 | D4 = 3.30 | N3 = 1.882997 | ν3 = 40.8 |
| R5 = 51.742 | D5 = Variable | | |
| R6 = 54.850 | D6 = 0.70 | N4 = 1.882997 | ν4 = 40.8 |
| R7 = 6.657 | D7 = 2.93 | | |
| R8 = 197.107 | D8 = 0.65 | N5 = 1.834000 | ν5 = 37.2 |
| R9 = 15.315 | D9 = 1.25 | | |
| R10 = −38.282 | D10 = 0.65 | N6 = 1.834000 | ν6 = 37.2 |
| R11 = 30.242 | D11 = 0.67 | | |
| R12 = 17.313 | D12 = 1.91 | N7 = 1.922860 | ν7 = 18.9 |
| R13 = −71.811 | D13 = Variable | | |
| R14 = Stop | D14 = 1.75 | | |
| R15 = 8.469 | D15 = 3.23 | N8 = 1.583126 | ν8 = 59.4 |
| R16 = −58.640 | D16 = 0.27 | | |
| R17 = 12.433 | D17 = 1.87 | N9 = 1.583126 | ν9 = 59.4 |
| R18 = 105.804 | D18 = 0.60 | N10 = 1.806100 | ν10 = 33.3 |
| R19 = 7.147 | D19 = Variable | | |
| R20 = 13.115 | D20 = 3.83 | N11 = 1.583126 | ν11 = 59.4 |
| R21 = −7.443 | D21 = 0.60 | N12 = 1.846660 | ν12 = 23.9 |
| R22 = −13.364 | D22 = Variable | | |
| R23 = ∞ | D23 = 2.39 | N13 = 1.516330 | ν13 = 64.1 |
| R24 = ∞ | | | |

| | Focal Length | | |
|---|---|---|---|
| Variable Distance | 4.65 | 14.35 | 45.34 |
| D5 | 0.70 | 13.65 | 21.59 |
| D13 | 22.64 | 9.69 | 1.75 |
| D19 | 6.68 | 4.02 | 5.60 |
| D22 | 6.52 | 9.17 | 7.59 |

| | Aspherical Coefficients | | |
|---|---|---|---|
| R15 | k = −1.49410e+00 | B = 2.43944e−04 | C = 4.36627e−07 |
| | D = −1.68648e−08 | E = −2.69631e−11 | A' = 0.00000e+00 |
| | B' = 0.00000e+00 | C' = 0.00000e+00 | D' = 0.00000e+00 |
| | E' = 0.00000e+00 | | |
| R17 | k = 1.10014e+00 | B = −2.76395e−04 | C = −4.48472e−06 |
| | D = 7.67186e−08 | E = −1.81361e−10 | A' = 0.00000e+00 |
| | B' = 0.00000e+00 | C' = 0.00000e+00 | D' = 0.00000e+00 |
| | E' = 0.00000e+00 | | |
| R20 | k = 1.10501e+00 | B = −1.14130e−04 | C = 1.10058e−06 |
| | D = −3.12154e−08 | E = 0.00000e+00 | A' = 0.00000e+00 |
| | B' = 0.00000e+00 | C' = 0.00000e+00 | D' = 0.00000e+00 |
| | E' = 0.00000e+00 | | |

THIRD NUMERICAL EXAMPLE

| f = 5.17 to 50.18 Fno = 1.85 to 3.00 2ω = 65.9° to 7.6° | | | |
|---|---|---|---|
| R1 = 72.137 | D1 = 1.45 | N1 = 1.846660 | ν1 = 23.9 |
| R2 = 23.655 | D2 = 6.41 | N2 = 1.639999 | ν2 = 60.1 |
| R3 = −190.955 | D3 = 0.20 | | |
| R4 = 21.700 | D4 = 3.32 | N3 = 1.882997 | ν3 = 40.8 |
| R5 = 58.413 | D5 = Variable | | |
| R6 = 70.654 | D6 = 0.76 | N4 = 1.882997 | ν4 = 40.8 |
| R7 = 6.383 | D7 = 2.34 | | |
| R8 = 301.822 | D8 = 0.71 | N5 = 1.882997 | ν5 = 40.8 |
| R9 = 18.048 | D9 = 0.97 | | |
| R10 = −31.144 | D10 = 0.71 | N6 = 1.806100 | ν6 = 33.3 |
| R11 = 30.925 | D11 = 0.63 | | |
| R12 = 17.380 | D12 = 1.71 | N7 = 1.922860 | ν7 = 18.9 |
| R13 = −59.517 | D13 = Variable | | |
| R14 = Stop | D14 = 1.75 | | |
| R15 = 8.761 | D15 = 2.96 | N8 = 1.693500 | ν8 = 53.2 |

-continued

| | | | |
|---|---|---|---|
| R16 = −496.456 | D16 = 1.79 | | |
| R17 = 31.396 | D17 = 0.60 | N9 = 1.805181 | ν9 = 25.4 |
| R18 = 8.328 | D18 = 0.64 | | |
| R19 = 15.916 | D19 = 1.59 | N10 = 1.583126 | ν10 = 59.4 |
| R20 = ∞ | D20 = Variable | | |
| R21 = 14.130 | D21 = 3.08 | N11 = 1.583126 | ν11 = 59.4 |
| R22 = −9.103 | D22 = 0.60 | N12 = 1.846660 | ν12 = 23.9 |
| R23 = −22.016 | D23 = Variable | | |
| R24 = ∞ | D24 = 2.39 | N13 = 1.516330 | ν13 = 64.1 |
| R25 = ∞ | | | |

| | Focal Length | | |
|---|---|---|---|
| Variable Distance | 5.17 | 16.07 | 50.18 |
| D5 | 0.70 | 12.17 | 18.62 |
| D13 | 19.65 | 8.18 | 1.73 |
| D20 | 5.69 | 2.91 | 7.86 |
| D23 | 5.51 | 8.29 | 3.33 |

| Aspherical Coefficients | | | |
|---|---|---|---|
| R15 | k = −4.54963e−01 | B = −1.71155e−05 | C = 1.94729e−07 |
| | D = −1.35946e−09 | E = −7.48429e−11 | A' = 0.00000e+00 |
| | B' = 0.00000e+00 | C' = 0.00000e+00 | D' = 0.00000e+00 |
| | E' = 0.00000e+00 | | |
| R19 | k = 1.62512e+00 | B = −1.04821e−04 | C = −4.21437e−06 |
| | D = 4.69319e−08 | E = 0.00000e+00 | A' = 0.00000e+00 |
| | B' = 0.00000e+00 | C' = 0.00000e+00 | D' = 0.00000e+00 |
| | E' = 0.00000e+00 | | |
| R21 | k = 5.42661e−02 | B = −5.82813e−06 | C = 8.44358e−07 |
| | D = 4.17548e−08 | E = −2.52813e−09 | A' = 0.00000e+00 |
| | B' = 0.00000e+00 | C' = 0.00000e+00 | D' = 0.00000e+00 |
| | E' = 0.00000e+00 | | |

TABLE 1

| Expression | 1st Example | 2nd Example | 3rd Example |
|---|---|---|---|
| (1) | 3.485 | 4.930 | 3.403 |
| (2) | 3.110 | 3.110 | 3.884 |
| (3) | 1.116 | 1.579 | 1.092 |
| (4) | 0.996 | 0.996 | 1.246 |
| (5) | 1.834807 | 1.882997 | 1.882997 |
| (6) | 18.9 | 18.9 | 18.9 |
| (7) | 2.657 | 2.153 | 2.117 |
| (8) | 1.239 | 1.218 | 1.148 |

An exemplary embodiment of a video camera equipped with the zoom lens system according to any one of the embodiments of the present invention as an image-forming optical system will now be described with reference to FIG. 13.

Referring to FIG. 13, the video camera includes a video camera body 10, an image-forming optical system 11 defined by the zoom lens system according to any one of the embodiments of the present invention, a solid-state image pickup element 12 such as a CCD sensor that optically receives an image of an object via the image-forming optical system 11, a memory 13 that stores the image of the object optically received by the solid-state image pickup element 12, and a viewfinder 14 for viewing the image of the object displayed on a display element (not shown). The display element may be defined by, for example, a liquid crystal panel and can display the image of the object formed on the solid-state image pickup element 12.

By applying the zoom lens system according to any one of the embodiments of the present invention to an image pickup apparatus such as a video camera, a compact optical apparatus having high optical performance can be provided.

The zoom lens system according to each embodiment of the present invention can be similarly applied to other image pickup apparatuses, such as a digital still camera and a digital single-lens reflex camera.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-159960 filed Jun. 18, 2007, which is hereby incorporated by reference herein in its entirety.

What is claimed is:

1. A zoom lens system comprising:
a first lens unit having positive optical power;
a second lens unit having negative optical power, the second lens unit being configured to move when the zoom lens system performs zooming;
a third lens unit having positive optical power; and
a fourth lens unit having positive optical power, the fourth lens unit being configured to move when the zoom lens system performs zooming,
wherein the first, second, third, and fourth lens units are arranged in that order from an object side towards an image side,
wherein the second lens unit consists of a negative lens element, a negative lens element, a negative lens element, and a positive lens element that are arranged in that order from the object side towards the image side,
wherein the following conditions are satisfied:

$$3.0 < f3/fw < 5.5, \text{ and}$$

$$3.1 < f4/fw < 4.5,$$

where f3 denotes a focal length of the third lens unit, f4 denotes a focal length of the fourth lens unit, and fw denotes a focal length of the entire system at a wide-angle end, and
wherein the following conditions are satisfied:

$$1.00 < f3/\sqrt{fw \times ft} < 1.65$$

$$0.90 < f4/\sqrt{fw \times ft} < 1.30$$

where ft denotes a focal length of the entire system at a telephoto end.

2. The zoom lens system according to claim 1, wherein the first lens unit has a positive lens element positioned closest to the image side, and
wherein the following condition is satisfied:

$$1.83 < N13$$

where N13 denotes a refractive index of a material constituting the positive lens element positioned closest to the image side in the first lens unit.

3. The zoom lens system according to claim 1, wherein the following condition is satisfied:

$$\nu 24 < 20$$

where ν24 denotes an Abbe number of a material constituting the positive lens element in the second lens unit.

4. The zoom lens system according to claim 1, wherein the following condition is satisfied:

$$2.02 < |f24/f2| < 2.90$$

where f24 denotes a focal length of the positive lens element in the second lens unit, and f2 denotes a focal length of the second lens unit.

5. The zoom lens system according to claim 1, wherein the following condition is satisfied:

$1.10 < f21/f2 < 1.36$ where f21 denotes a focal length of the negative lens element located closest to the object side in the second lens unit, and f2 denotes a focal length of the second lens unit.

6. The zoom lens system according to claim 1, wherein the negative lens element, the negative lens element, the negative lens element, and the positive lens element included in the second lens unit respectively comprise a negative meniscus lens element having a concave surface on the image side, a negative lens element having a concave surface on the image side, a negative biconcave lens element, and a positive lens element having a convex surface on the object side, which are arranged in that order from the object side towards the image side.

7. The zoom lens system according to claim 1, wherein the third lens unit consists of a positive biconvex lens element, a positive lens element having a convex surface on the object side, and a negative lens element having a concave surface on the image side, which are arranged in that order from the object side towards the image side.

8. The zoom lens system according to claim 1, wherein the fourth lens unit consists of a cemented lens including a positive biconvex lens element and a negative meniscus lens element having a convex surface on the image side.

9. A camera comprising:
the zoom lens system according to claim 1; and
a solid-state image pickup element configured to optically receive an image formed by the zoom lens system.

10. A zoom lens system comprising:
a first lens unit having positive optical power;
a second lens unit having negative optical power, the second lens unit being configured to move when the zoom lens system performs zooming;
a third lens unit having positive optical power; and
a fourth lens unit having positive optical power, the fourth lens unit being configured to move when the zoom lens system performs zooming,
wherein the first, second, third, and fourth lens units are arranged in that order from an object side towards an image side,
wherein the second lens unit consists of a negative lens element, a negative lens element, a negative lens element, and a positive lens element that are arranged in that order from the object side towards the image side,
wherein the following conditions are satisfied:

$3.0 < f3/fw < 5.5$, and $3.1 < f4/fw < 4.5$, where f3 denotes a focal length of the third lens unit, f4 denotes a focal length of the fourth lens unit, and fw denotes a focal length of the entire system at a wide-angle end,
wherein the first lens unit has a positive lens element positioned closest to the image side, and
wherein the following condition is satisfied:

$1.83 < N13$ where N13 denotes a refractive index of a material constituting the positive lens element positioned closest to the image side in the first lens unit.

11. A zoom lens system comprising:
a first lens unit having positive optical power;
a second lens unit having negative optical power, the second lens unit being configured to move when the zoom lens system performs zooming;
a third lens unit having positive optical power; and
a fourth lens unit having positive optical power, the fourth lens unit being configured to move when the zoom lens system performs zooming,
wherein the first, second, third, and fourth lens units are arranged in that order from an object side towards an image side,
wherein the second lens unit consists of a negative lens element, a negative lens element, a negative lens element, and a positive lens element that are arranged in that order from the object side towards the image side,
wherein the following conditions are satisfied:

$3.0 < f3/fw < 5.5$, and $3.1 < f4/fw < 4.5$, where f3 denotes a focal length of the third lens unit, f4 denotes a focal length of the fourth lens unit, and fw denotes a focal length of the entire system at a wide-angle end, and
wherein the following condition is satisfied:

$2.02 < |f24/f2| < 2.90$ where f24 denotes a focal length of the positive lens element in the second lens unit, and f2 denotes a focal length of the second lens unit.

* * * * *